C. M. CURRY.
FLYTRAP.
APPLICATION FILED SEPT. 6, 1917.
1,341,416. Patented May 25, 1920.
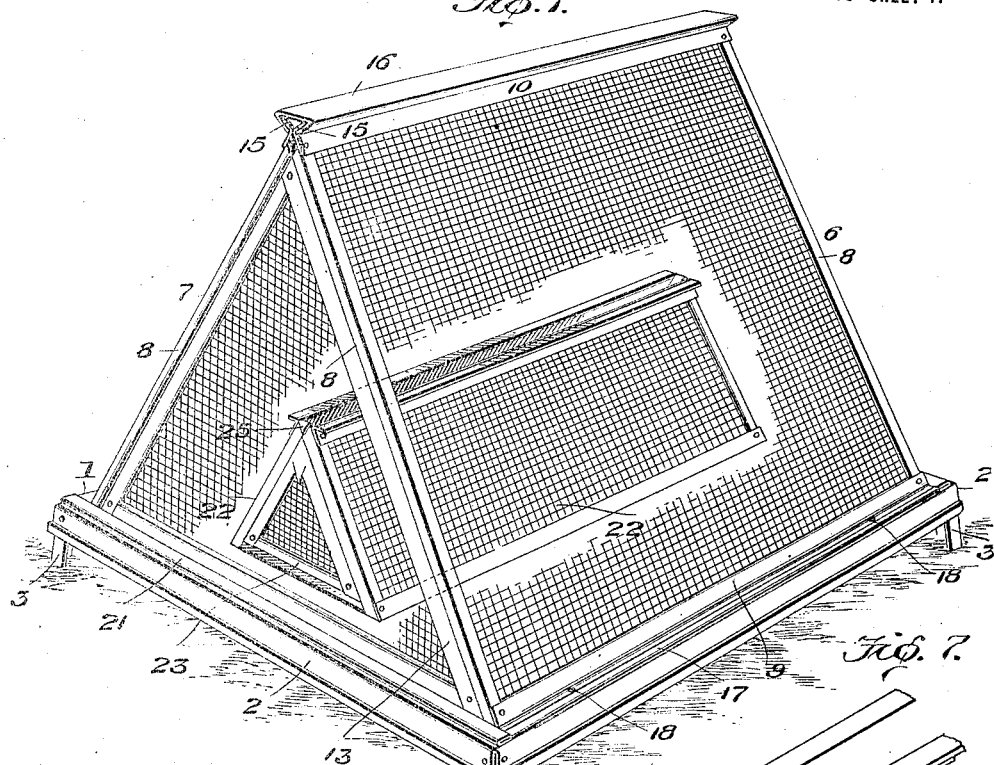
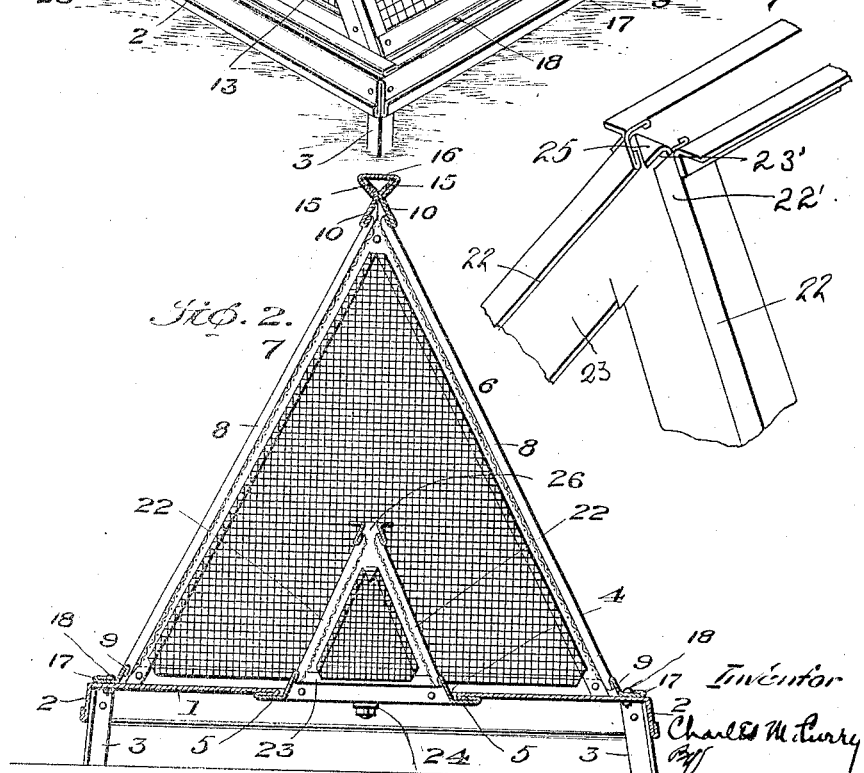

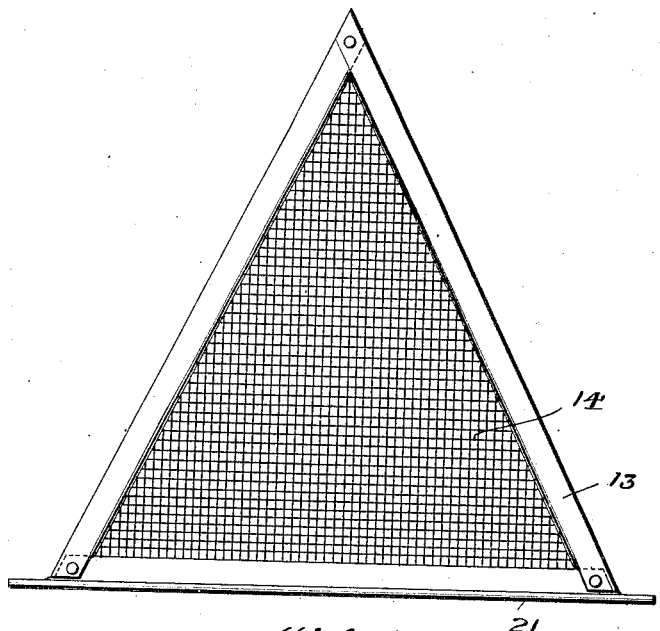
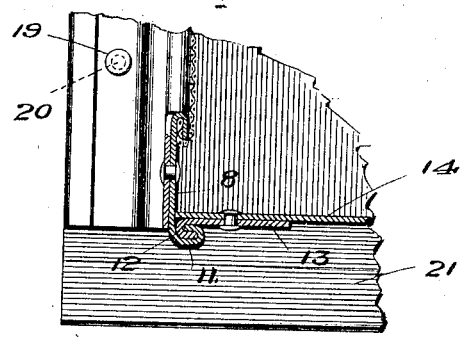
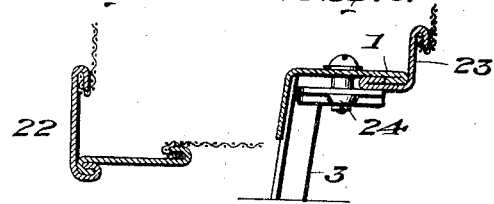

UNITED STATES PATENT OFFICE.

CHARLES M. CURRY, OF PADUCAH, KENTUCKY.

FLYTRAP.

1,341,416.  Specification of Letters Patent.  Patented May 25, 1920.

Application filed September 6, 1917. Serial No. 190,002.

*To all whom it may concern:*

Be it known that I, CHARLES M. CURRY, a citizen of the United States, residing at Paducah, in the county of McCracken and State of Kentucky, have invented certain new and useful Improvements in Flytraps, of which the following is a specification.

My invention relates to an improvement in knock-down fly-traps, and the present invention is an improvement on my fly-trap set forth in Letters Patent No. 1,167,339, dated Jan. 4, 1916.

This present invention consists in an all-metal trap made in nine detachable sections, and it comprises an outer frame or superstructure made up of four of these sections detachably connected together, and detachably connected with a base, and an inner frame similarly made of detachably connected sections and detachably connected with the base, which is the part which traps an insect by permitting it to enter the trap, while preventing its egress therefrom, and which is detachably removable to permit of the removal of the dead flies without the escape of the living ones from the trap.

When the trap is knocked down, it is capable of being packed in small compass and shipped in a container of comparatively small dimensions, and it is easily assembled or taken apart, and is most effectual in ridding a place of flies on a large scale, as has been thoroughly demonstrated.

The trap operates on the principle of creating a dark space beneath, with a central light space which aids in luring the insect to the baited trap through the opening in the center.

In the accompanying drawings:—

Figure 1 is a view in perspective;

Fig. 2 is a view of one of the end sections;

Fig. 3 is a vertical sectional view through the entire trap;

Fig. 4 is a horizontal section through one of the joints; and

Figs. 5 and 6 are details of parts of the inner frame.

Fig. 7 is a fragmentary perspective view of the upper portion of the inner frame showing the manner in which the several elements thereof are locked together after being assembled.

The numeral 1 represents the base, which preferably consists in a piece of sheet-metal of the desired proportions, with the corners cut, and the edges flared downwardly to form flanges 2, 2, the ends of which are riveted to legs 3, 3, upon which the base rests more or less elevated above the surface on which the trap is placed, to allow space for the insects to enter.

In the center, an opening 4 is formed, the edges 5 thereof being preferably bent backwardly, both to give strength to the base of the center, and to give finish and smoothness to the opening.

The outer frame or superstructure comprises the two rectangular sides 6 and 7, made of wire netting, with the sheet-metal bindings, namely the side strips 8, 8, the bottom strips 9, and the top strips 10, all bent to form a binding around the edges of the netting, as shown in the sectional views, and riveted or otherwise secured together at their ends to form a solid frame.

The two side strips 8, 8, are bent at their outer edges into the form of an interlocking flange 11, adapted to have a sliding interlocking connection with a counterpart flange 12 on the side strip 13 of the triangular or A-shaped end forms 14 of the outer frame or superstructure. The upper strips 10 of the frame are bent outwardly, forming the flanges 15, and a removable slide-key 16 is adapted to embrace these flanges 15 to form a sliding key which holds the frame together at the top when set up.

The bottom strips 9 terminate in an outwardly-extending flange 17, which has holes 18 therein to receive the bolts 19 which extend through corresponding holes 20 in the base, whereby the outer frame or superstructure is secured to the base. Corresponding bottom strips 21 are provided for the triangular or A-shaped end members of the frame. These rest flat upon the base, and generally require no bolting, although they could be bolted to the base, if desired.

The inner removable frame is very similar to the outer frame, and is composed of sides 22, provided with interlocking flanges 22' adapted to have sliding interlocking engagement with a counterpart flange 23' of the end members 23. This frame is of a size to enter the opening 4 in the center of the base. The base flanges of the inner end rest beneath the base 1, where they are held by turn-buttons 24, which may be turned aside when it is desired to detach the inner frame to remove the dead flies, which can be done without the escape of the flies still alive in the trap.

The inner frame, while preferably to all intents and purposes the same in general construction as the outer frame, is adapted to have the sharp apexes of the end frames bent downwardly when assembled, thereby forming a key 25 to prevent the dismemberment of the inner frame as clearly shown in Fig. 7, this being the equivalent of the slide-key 16, previously described.

The flies are attracted by the centrally located light streak at the bottom of the trap, and readily pass up through the opening 26 along the apex of the inner frame, and once passing through, they become entrapped and will not find their way back through the opening.

This trap is designed primarily for out-of-door use, and the basic principle of the trap is the contrast between the light and dark beneath it. The bait is placed in the center of the light streak under the trap.

An important feature of the invention is that it is so constructed that the dead flies can be removed therefrom without liberating the live ones. This obviates the necessity of killing the live flies in the trap, and at the same time increases the efficiency of the trap from three to five times, as it has been found that, when a trap is full of live flies, it will catch from three to five times as many as when there are no live ones in the trap.

To remove the dead flies, it is simply necessary to remove the inner frame and shake the flies out through the opening 4 in the base. The live flies in the trap will not escape if the opening in the bottom is kept down.

To put the trap together, the ends and sides of the outer frame or superstructure are slid together, and the slide-key is slid over the flanges at the top, whereupon the flanges at the bottom are bolted to the base. The inner frame is similarly assembled, and the apexes are bent down to form a key, no other form of key being permissible as it must be open at the apex throughout its length for the ingress of the flies. It is then inserted in the hole through the center of the base, and locked in place.

To knock down the trap, the inner frame is removed and slid apart, and the upper frame is removed and dismembered in like manner, whereupon the parts are all nested together with the base, and the trap is ready for shipment.

I claim:

1. A knock-down fly-trap comprising an inner and outer frame, each composed of rectangular sides and triangular ends, the edges of which are detachably connected together, and a hollow key engaging the flared upper edges of the side members of the outer frame, whereby the end and side members are held in place, and the apex of the end members of the inner frame bent downwardly when assembled to prevent the dismemberment of the inner frame.

2. A knock-down fly-trap comprising an inner and outer frame, each composed of sections detachably connected together at their meeting edges, a key engaging the flared upper edges of the side members of the outer frame for holding the members of the frame together, and the apexes of the end members of the inner frame bent downwardly when assembled to prevent dismemberment of the inner frame, a base having an opening therein, open supporting means at the sides to hold it above the supporting surface, whereby contrasting light and dark spaces are formed beneath the trap, and the inner frame adapted to be inserted through the opening and detachably held in place therein.

In testimony whereof I affix my signature.

CHARLES M. CURRY.